United States Patent [19]

Russell et al.

[11] Patent Number: 4,788,621

[45] Date of Patent: Nov. 29, 1988

[54] MOLDED CASE CIRCUIT BREAKER MULTIPLE ACCESSORY UNIT

[75] Inventors: Ronald R. Russell, Plainville; Robert A. Morris, Burlington; Gregory T. DiVincenzo, Plainville; Graham A. Scott, Avon, all of Conn.

[73] Assignee: General Electric Company, New York, N.Y.

[21] Appl. No.: 133,869

[22] Filed: Dec. 16, 1987

[51] Int. Cl.[4] .................................... H02B 1/08

[52] U.S. Cl. .................................... 361/115; 361/92; 361/357

[58] Field of Search .................................... 335/6, 8-10, 335/13-15, 18, 20, 35, 23, 38, 132, 167-172, 174, 202; 200/56 R, 50 A, 303, 307, 308, 330, 331; 361/115, 331, 334, 335, 356, 357, 376, 393, 394, 426, 429, 92, 102

[56] References Cited

U.S. PATENT DOCUMENTS

| | | | |
|---|---|---|---|
| 4,013,926 | 3/1977 | Lang et al. | 361/115 |
| 4,016,518 | 4/1977 | Lang et al. | 335/7 |
| 4,025,823 | 5/1977 | Lang et al. | 361/111 |
| 4,205,361 | 5/1980 | Shimp | 361/92 |
| 4,297,663 | 10/1981 | Seymour et al. | 335/20 |
| 4,589,052 | 5/1986 | Dougherty | 361/94 |
| 4,591,942 | 5/1986 | Willard et al. | 361/97 |
| 4,622,444 | 11/1986 | Kandatsu et al. | 200/303 |
| 4,641,117 | 2/1987 | Willard et al. | 335/7 |
| 4,679,019 | 7/1987 | Todaro et al. | 335/172 |
| 4,700,161 | 10/1987 | Todaro et al. | 335/172 |
| 4,706,158 | 11/1987 | Todaro et al. | 361/92 |

FOREIGN PATENT DOCUMENTS 1370942 10/1974 United Kingdom .

OTHER PUBLICATIONS

Ser. No. 061,244 entitled "Molded Case Circuit Breaker Accessory Enclosure", Paul A. Raymont et al., filed 6/12/87.

Ser. No. 133868 entitled "Molded Case Circuit Breaker Auxiliary Switch Unit", Yuet-Ying Yu et al., filed concurrently (12/16/87).

Ser. No. 133867 entitled "Molded Case Circuit Breaker Shunt Trip Unit", Robert A. Morris et al., filed concurrently (12/16/87).

Ser. No. 2,033,177A (U.K. Patent Application) entitled "Circuit Breaker with Undervoltage Release".

Ser. No. 092,962 entitled "Molded Case Circuit Breaker Latch and Operation Mechanism Assembly", Roger N. Castonguay, et al., filed 9/3/87.

Ser. No. 045,645 entitled "Rating Plug Enclosure for Molded Case Circuit Breakers", Robert A. Morris et al. filed 5/4/87.

*Primary Examiner*—G. P. Tolin

*Attorney, Agent, or Firm*—Richard A. Menelly; Walter C. Bernkopf; Fred Jacob

[57] ABSTRACT

An integrated protection unit is a circuit breaker which includes basic overcurrent protection facility along with selective electrical accessories. A molded plastic accessory access cover secured to the integrated protection unit cover protects the accessory components contained within the circuit breaker cover from the environment. A combined overcurrent trip actuator and multiple accessory unit can be field-installed within the integrated protection unit.

13 Claims, 6 Drawing Sheets

MOLDED CASE CIRCUIT BREAKER MULTIPLE ACCESSORY UNIT

BACKGROUND OF THE INVENTION

The trend in the circuit protection industry is currently toward complete circuit protection which is accomplished by the addition of supplemental protection apparatus to standard overcurrent protective devices, such as molded case circuit breakers. In the past, when such auxiliary protection apparatus or other circuit breaker accessories were combined with a standard circuit breaker, the accessories were usually custom-installed at the point of manufacture. The combined protective device, when later installed in the field, could not be externally accessed for inspection, replacement or repair without destroying the integrity of the circuit breaker interior. An example of one such factory installed circuit breaker accessory is found in U.S. Pat. No. 4,297,663 entitled "Circuit Breaker Accessories Packaged in a Standardized Molded Case", which Patent is incorporated herein for reference purposes.

A more recent example of a circuit breaker including additional accessories is found in U.S. Pat. No. 4,622,444 entitled "Circuit Breaker Housing and Attachment Box" which allows the accessories to be field-installed within the circuit breaker without interfering with the integrity of the circuit breaker internal components. This is accomplished by mounting the accessories within a recess formed in the circuit breaker enclosure cover.

An electronic trip actuator which is mounted within the circuit breaker enclosure is described within U.S. Pat. No. 4,679,019 entitled "Trip Actuator for Molded Case Circuit Breakers". The circuit breaker actuator responds to trip signals generated by an electronic trip unit completely contained within a semi-conductor chip such as that described within U.S. Pat. No. 4,589,052. The development of a combined trp actuator for both overcurrent protection as well as accessory function is found within U.S. Pat. No. 4,700,161 entitled "Combined Trip Unit and Accessory Module for Electronic Trip Circuit Breakers". The aforementioned U.S. patents which represent the advanced state of the art of circuit protection devices are incorporated herein for reference purposes.

A shunt trip accessory unit allows the circuit breaker operating mechanism to be articulated to separate the circuit breaker contacts, usually to perform a tripping function for electrical system control and protection. One such shunt trip accessory unit is described within U.S. patent application Ser. No. 133,867 entitled "Molded Case Circuit Breaker Shunt Trip Unit". An auxiliary switch accessory unit allows an operator to determine the "ON" or "OFF" conditions of a molded case circuit breaker contacts at a remote location by means of an audible alarm or visible display. One such auxiliary unit is described within U.S. patent application Ser. No. 133,868 entitled "Molded Case Circuit Breaker Auxiliary Switch Unit". Both of the aforementioned U.S. patent applications are incorporated herein for purposes of reference.

One example of an undervoltage release circuit is found within United Kingdom Patent Application No. 2,033,177A entitled "Circuit Breaker with Undervoltage Release". The circuit described within this application applies a large initial current pulse to the undervoltage release coil to drive the plunger against the bias of a powerful compression spring and uses a ballast resistor to limit the holding current to the undervoltage release coil to a lower value. It is believed that the heat generated within this circuit would not allow the circuit to be contained within the confines of the circuit breaker enclosure.

Earlier undervoltage release circuits required different undervoltage release coils when used within different voltage-rated circuits. This in turn required inventory of a number of different coils and custom circuits for each undervoltage application.

One purpose of the instant invention is to provide a single undervoltage coil and circuit design over a wide range of circuit voltages.

SUMMARY OF THE INVENTION

An integrated protection unit which includes overcurrent protection along with auxiliary accessory function within a common enclosure contains an accessory cover for access to the selected accessory components to allow field installation of the accessory components prior to connecting the integrated protection unit within an electric circuit. A multiple accessory unit which includes an overcurrent trip coil along with an additional coil that provides shunt trip or undervoltage release functions is arranged within one part of the enclosure while a printed wire board and electric switch are arranged within a different part thereof. An additional printed wire board is required to provide the shunt trip function.

DESCRIPTION OF THE PREFERRED EMBODIMENT

Figure 1:
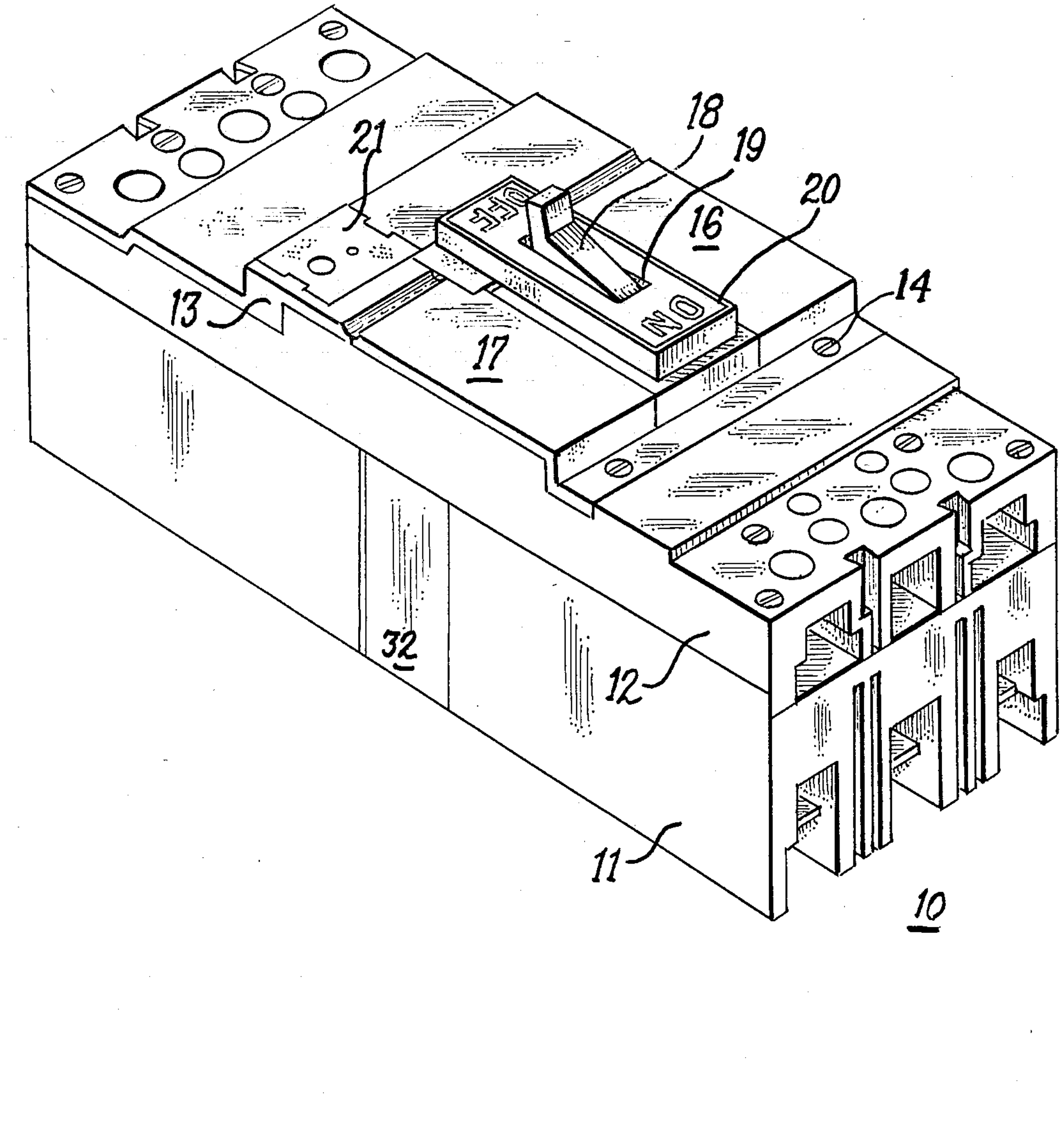
FIG. 1 is a top perspective view of an integrated molded case circuit breaker containing selected accessory functions.

An integrated circuit breaker 10 consisting of a molded plastic case 11 with a molded plastic cover 12 is shown in FIG. 1 with the accessory cover 13 attached to the circuit breaker cover. The circuit breaker operating handle 18 extends up from an access slot 19 formed in the cover escutcheon 20. A pair of accessory doors 16, 17 are formed in the accessory cover for providing access to the combined electromagnetic actuator and multiple accessory unit, hereafter "actuator-accessory unit" 34 contained within the recess 44, shown in FIG. 2. Still referring to FIG. 2, the rating plug 21 is fitted within a recess 25 formed in the accessory cover and the accessory cover 13 is fastened to the circuit breaker cover by means of screws 14. The actuator-accessory unit is described in U.S. Pat. No. 4,641,117, which patent is incorporated herein for purposes of reference, and contains a plunger 42 for interrupting the circuit breaker operating mechanism (not shown). The operating mechanism is similar to that described within U.S. patent application Ser. No. 092,962, filed Sept. 3, 1987 entitled "Molded Case Circuit Breaker Latch and Operating Mechanism Assembly", which application is incorporated herein for purposes of reference. The actuator-accessory unit includes a flux shift coil 39 which connects with an electronic trip unit 9 on the printed wire board 22 by means of wire conductors 38, and an accessory coil 37 which connects with the auxiliary switch-electronics enclosure 29 by means of wire conductors 40. The trip unit 9 on the printed wire board 22 is inserted in the printed wire board recess 23 formed in the circuit breaker cover 12 which connects electrically with the rating plug 21 by means of pins 24 upstanding on the printed wire board and sockets 26 formed in the bottom of the rating plug 21. The rating plug is described in U.S. patent application Ser. No. 045,645, filed May 4, 1987, entitled "Rating Plug Enclosure for Molded Case Case Circuit Breakers", which application is incorporated herein for purposes of reference. Access opening 8 formed on the top of the rating plug 21 allows for verifying the trip characteristics of the electronic trip unit 9. The electronic trip unit electrically connects with a current transformer (not shown) contained within the integrated circuit breaker case 11 and which is described in U.S. Pat. No. 4,591,942, which patent is incorporated herein for purposes of reference. The integrated circuit breaker 10 depicted in FIG. 1 includes three poles, with one current transformer supplied within each separate pole. Still referring to FIG. 2, in accordance with the instant invention, the auxiliary switch and accessory electronics enclosure 29, hereafter "switch-electronics enclosure" is inserted within a recess 30 formed in the integrated circuit breaker cover 12 and is positioned such that a depending operating lever 33 interacts with the circuit breaker operating mechanism in a manner to be described below in greater detail. Wire conductors 31, 31' electrically connect with a remote voltage source (not shown) through a wire access slot 32 formed in the case 11 to articulate the circuit breaker operating mechanism to separate the circuit breaker contacts by either a shunt trip or undervoltage release function in a manner to be described below in some detail. The wire conductors 31 connect with an external voltage source to the undervoltage release electronics and the wire conductors 31' connect an external voltage source to the shunt trip electronics (not shown). In the particular arrangement depicted in FIG. 2, access to the actuator-accessory unit 34 is made by means of accessory door 16 which is integrally formed within the accessory cover 13 and access to the switch-electronics enclosure 29 is made by means of accessory door 17. This arrangement differs from that described in concurrently filed U.S. patent application Ser. No 133,868 entitled "Molded Case Circuit Breaker Auxiliary Switch Unit" which does not provide undervoltage release or shunt trip functions and Ser. No. 133,867 entitled "Molded Case Circuit Breaker Shunt Trip Unit" which does not provide an undervoltage release function. The accessory doors 16, 17 are hingably attached to the accessory cover 13 by means of a hinge 15 integrally formed therein and the accessory door is then fastened to the circuit breaker cover by means of screws 14, thru hole 27 formed in the accessory door, and threaded openings 28 formed in the circuit breaker cover. A good description of the accessory cover 13 is found within U.S. patent application Ser. No. 061,244, filed June 12, 1987 and entitled "Molded Case Circuit Breaker Accessory Enclosure", which application is incorporated herein for reference purposes.

In an earlier combined actuator-accessory unit described in U.S. Pat. No. 4,706,158 entitled "Circuit Breaker with Self-Contained Electronic Trip Actuator and Undervoltage Release Control Circuit" the electronics for controlling the trip actuator, shunt trip and undervoltage release coils were contained on separate printed wire boards contained in a common unit with the flux shift and undervoltage release coils. In the actuator-accessory unit 34 of the instant invention, which is similar to that described in the aforementioned U.S. Pat. No. 4,641,117 entitled "Combined Accessory and Trip Actuator Unit for Electronic Circuit Breakers", the flux shift coil 39 and the accessory coil 36 are intentionally separated from the accessory electronics. The accessory electronics for controlling the actuator-accessory unit 34 of this invention are contained within a pair of printed wire boards 61, 68 (FIG. 3) containing circuits depicted in FIGS. 4–8 which will be discussed below in greater detail. In operating the shunt trip aspect of the actuator-accessory unit, which involves the plunger 42, compression spring 43, magnetic diverter 85, magnetic conductor 41, flux shift coil 39 and permanent magnet 36 all contained within a metallic casing 35, the permanent magnet 36 holds the plunger 42 against the bias provided by the charged compression spring 43 in the absence of any voltage applied to the flux shift coil 39 over wire conductors 38. Upon the occurrence of an over-current condition, a voltage applied to the wire conductors 38 via the printed wire board 22 energizes the flux shift coil 39 which generates a magnetic field in opposition to the magnetic field supplied by the permanent magnet 36 and diverts the magnetic field of the permanent magnet to the casing 35 via the magnetic diverter 85. The plunger 42 is then rapidly propelled in the forward indicated direction by the bias provided by the charged compression spring 43 to interact with the circuit breaker operating mechanism, as described earlier. When the actuator-accessory unit 34 includes an undervoltage-release accessory function, the accessory coil 37 is an undervoltage release coil and the permanent magnet 36 is absent such that the magnetic holding force provided to the plunger 42, via magnetic conductor 41, is supplied by the flux generated by the undervoltage release coil 37, per se. When the voltage supplied to the wire conductors 38 via the switch-electronics enclosure 29 decreases to a predetermined value for a predetermined period of time, the magnetic force applied to the plunger is insufficient to hold the plunger against the bias of the charged compression spring 43 and the plunger becomes propelled in the indicated direction to articulate the circuit breaker operating mechanism. When the actuator-accessory unit 34 is arranged as a shunt-trip accessory, the permanent magnet 36 is present and the accessory coil 37 is a shunt trip coil which, upon the application of a voltage to the wire conductors 40 via the switch-electronics enclosure 29, generates a reverse magnetic field to that of the permanent magnet 36, to substantially reduce the magnetic force provided by the permanent magnet 36 and thereby allow the plunger 42 to become propelled in the indicated direction by the bias of the compression spring 43.

Figure 2:
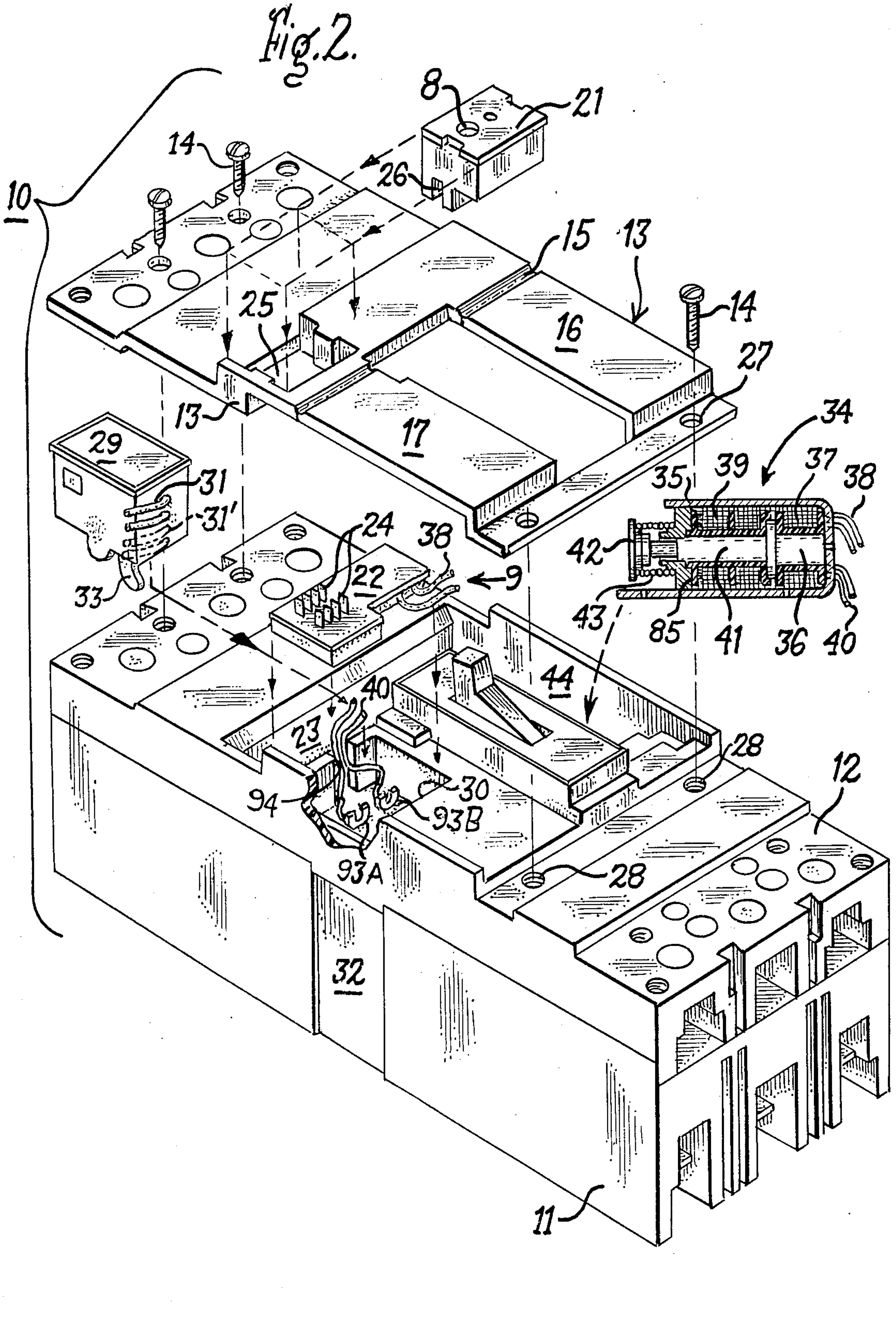
FIG. 2 is an exploded top perspective view of the integrated circuit breaker of FIG. 1 prior to assembly of the accessory components.
Figure 3:
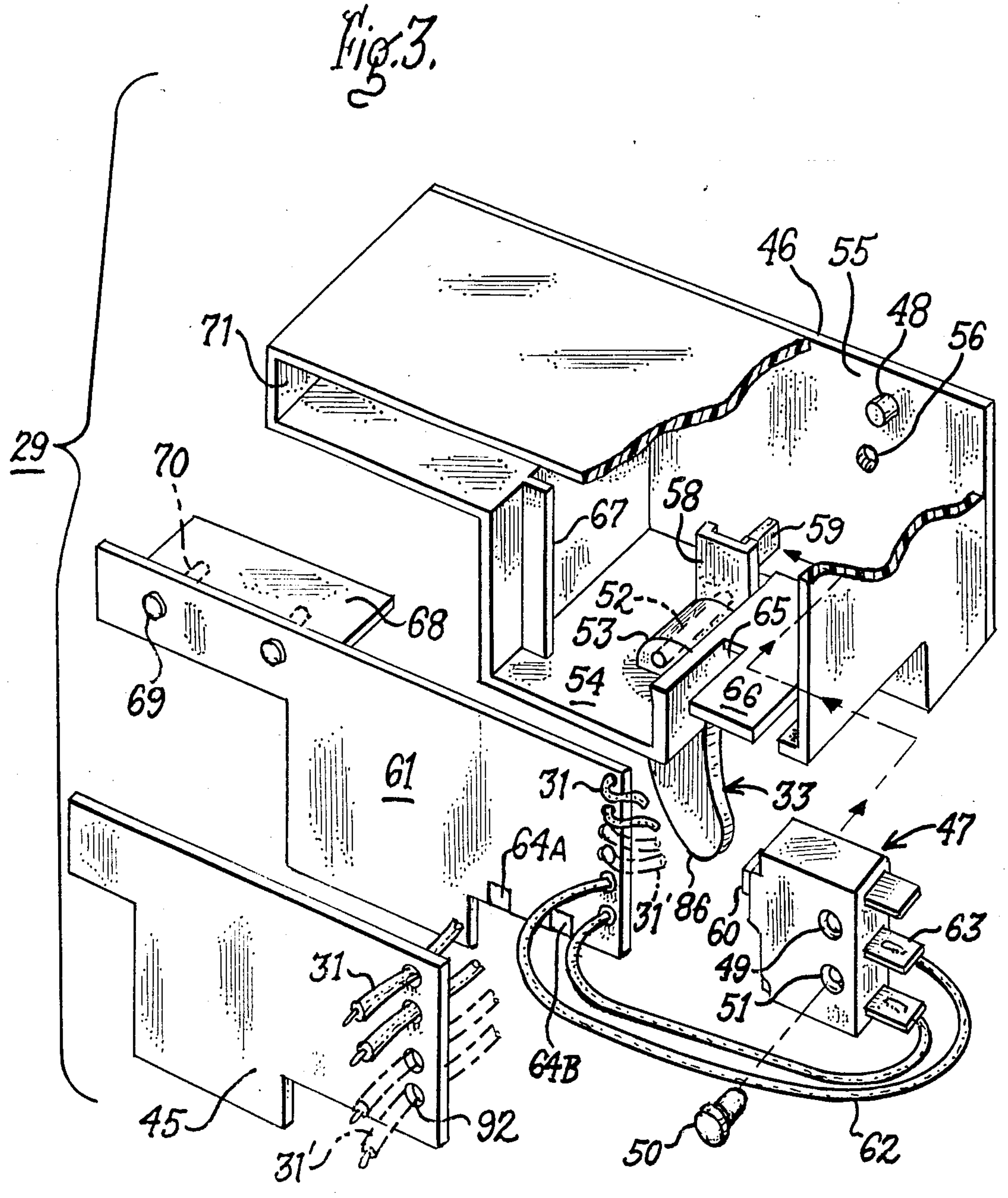
FIG. 3 is an exploded front view of the auxiliary switch and accessory electronics enclosure of FIG. 2 prior to assembly.

The switch-electronics enclosure 29 is assembled in the manner best seen by referring now to FIG. 3. An electric switch 47 is positioned within the switch-electronics enclosure case 46 by capturing a post 48, formed on the back wall 55 of the case, within a thru hole 49 on the electric switch and fastening the switch to the rear wall by means of a rivet 50, thru hole 51 and thru hole 56. The electric switch is now positioned such that the plunger 60 interacts with a tab 59 extending from the top extension 58 of the operating lever 33 with the bottom extension 86 arranged for interacting with the circuit breaker operating mechanism. The operating lever 33 is pivotally arranged within a journal 53 integrally formed in the bottom 54 of the case by means of the pivot pin 52. The electric switch connects with a printed wire board 61 by means of a pair of wire conductors 62 attached to the wire connectors 63 which extend from the electric switch at one end and are soldered to the printed wire board 61 at an opposite end. The electric switch operates in the manner described within aformentioned U.S. patent application Ser. No 133,868. When the printed wire board 61 is inserted within the case 46, the projection 67 formed within the case positions the printed wire board such that a pair of edge-connector pads 64A, 64B on the bottom of the printed wire board are aligned with a corresponding pair of slots 65 formed within the extension 66 of the bottom 54 for electrically interconnecting the printed wire board 61 with stab-connectors 93A, 93B upstanding from the bottom of the recess 30 (FIG. 2) as also described within the aforementioned U.S. patent application Ser. No. 133,868. The stab connectors electrically connect with the wire conductors 40 by means of wire slot 94 formed in the side of the recess 30, as best seen in FIG. 2.

Figure 4:
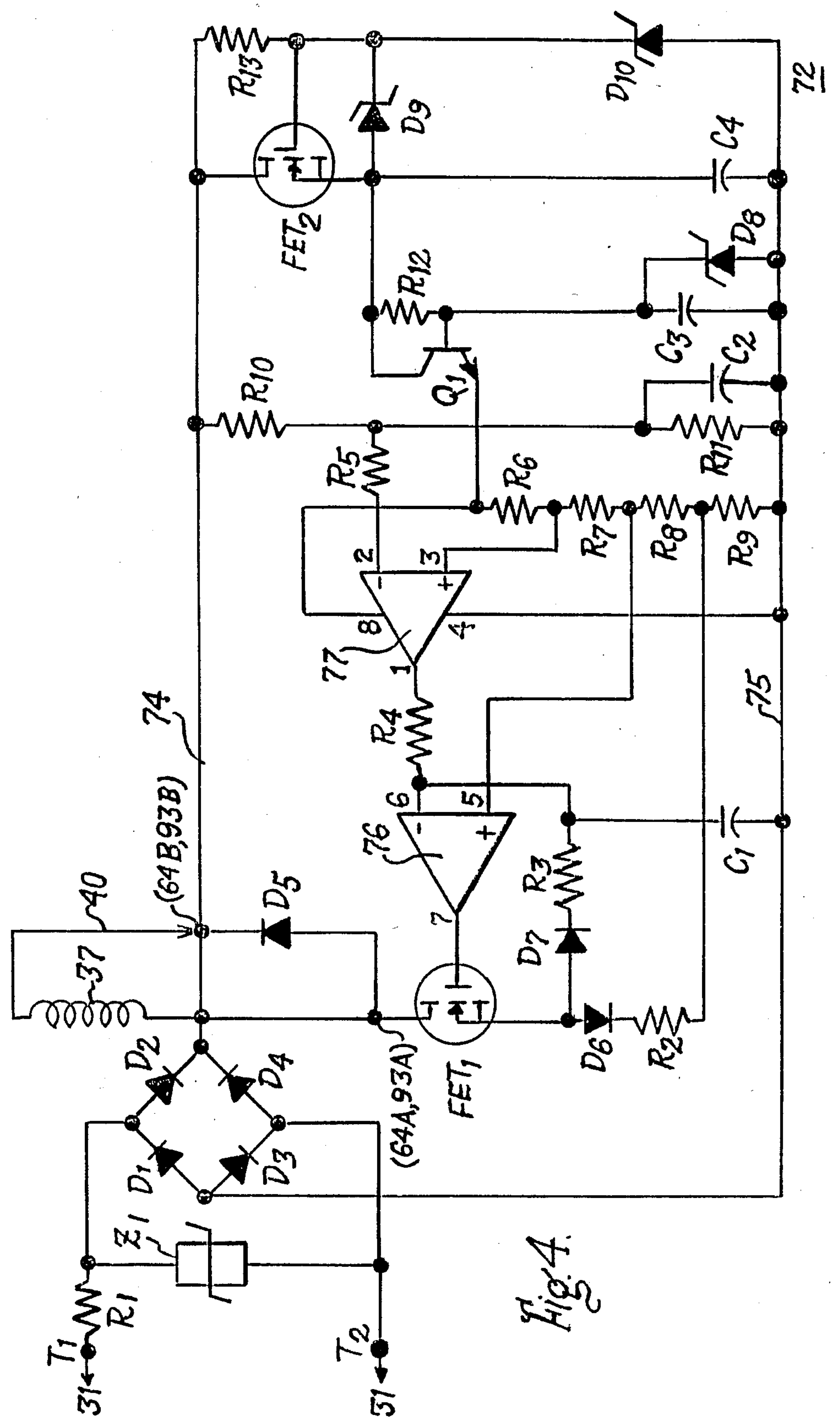
FIG. 4 is a schematic representation of an undervoltage release circuit on the printed wire board depicted in FIG. 3.
Figure 5:
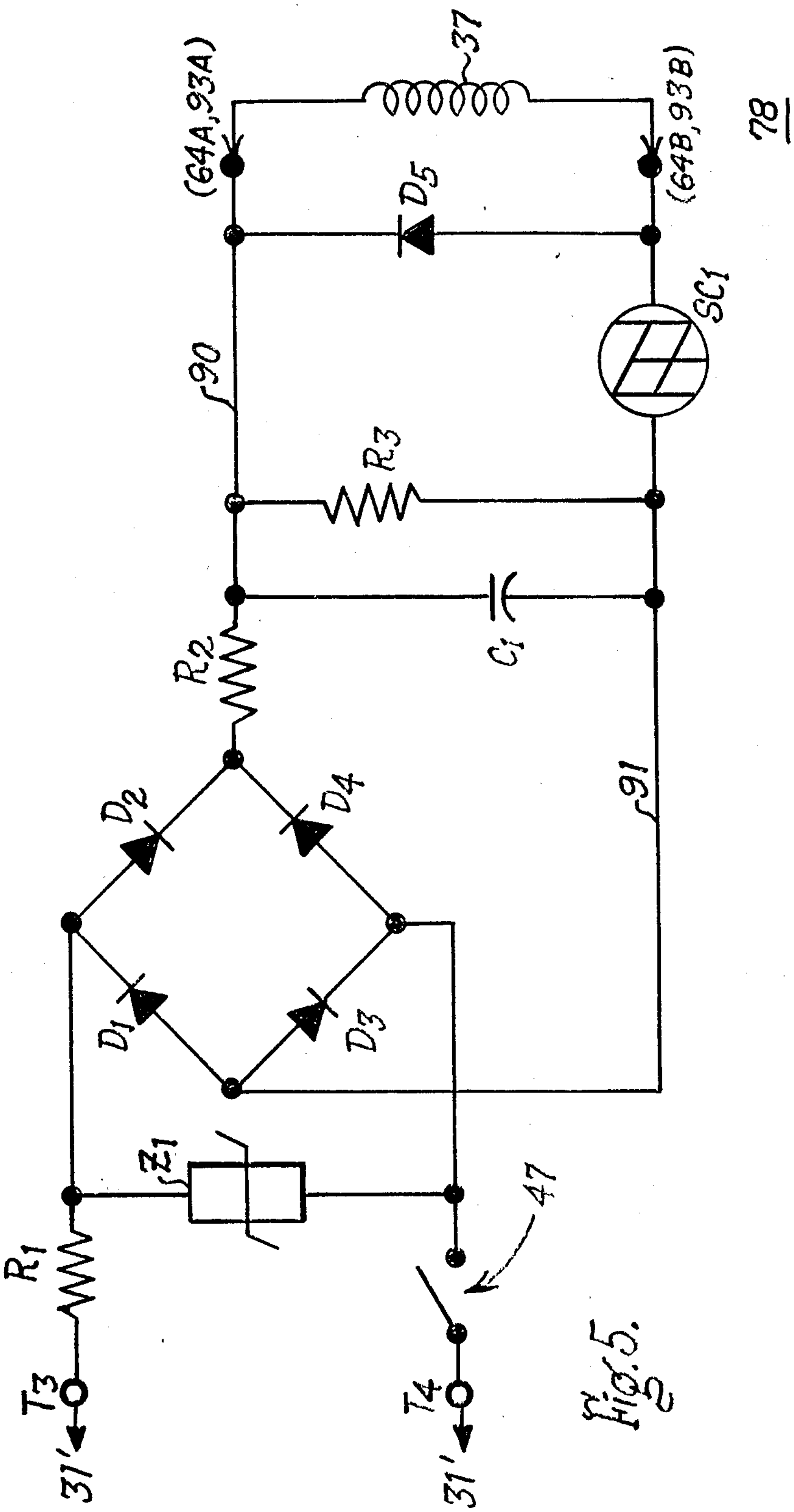
FIG. 5 is a schematic representation of a shunt trip circuit on the printed wire board depicted in FIG. 3.

Referring back to FIG. 3, selection of a desired accessory is made by selecting the appropriate actuator-accessory unit which contains either a shunt trip coil or an undervoltage release coil in addition to the flux shift coil 39 (FIG. 2) along with selection of a corresponding switch-electronics enclosure 29. The shunt trip function per se is provided by a circuit such as that shown at 78 in FIG. 5, contained within the switch-electronics enclosure while the undervoltage function, per se is provided by a circuit such as that shown in FIG. 4, contained within the switch-electronics enclosure. For the switch-electronics enclosure 29 of FIG. 3 has facility for providing either undervoltage function per se or undervoltage function along with shunt trip function when used with an actuator-accessory unit which includes an undervoltage coil. Still referring to FIG. 3, the printed wire board 68, which is mechanially and electrically connected with the printed wire board 61 by means of plugs 69 extending from the printed wire board 61 and sockets 70 within the printed wire board 68 contains the shunt trip circuit 78 (FIG. 5). When the printed wire board 68 is attached to the printed wire board 61, the printed wire board 68 seats within the extension 71 arranged on the opposite side of the case 46 from the extension 66. Since the accessory coil 37 within the actuator-accessory unit 34 of FIG. 2 is an undervoltage coil, as described earlier the undervoltage circuit 72 (FIG. 4) on the printed wire board 61 controls the operation of the undervoltage coil. The switch-electronics enclosure cover 45 is sealed to the case 46 by ultrasonic welding techniques and the wire conductors 31, 31' exit through openings 92.

The undervoltage circuit 72 of FIG. 4 enables the undervoltage accessory coil 37 when the voltage across terminals T1, T2, falls below a predetermined value for a predetermined time. An external voltage source (not shown) is applied to terminals T1, T2 via conductors 31 thereby providing current through the current limiting resistor R1 and the rectifier consisting of diodes $D_1$–$D_4$ to the negative bus 75. A varistor $Z_1$ is connected across the terminals to protect the undervoltage circuit 72 from voltage surges. The other output of the diode rectifier connects with the positive bus 74. The undervoltage release coil 37 is connected between the positive bus 74 and the drain terminal of a $FET_1$, the source of the $FET_1$ connects with the negative bus 75 through diode $D_6$, and resistors $R_2$, $R_9$. A flyback diode $D_5$ is used to circulate current back through the undervoltage accessory coil when the $FET_1$ is turned off. Output pin 7 of a comparator 76 connects with the gate of the $FET_1$ and input pin 6 of the comparator connects with the source of $FET_1$ through resistor $R_3$ and diode $D_7$. The input pin 6 connects with the negative bus 75 through capacitor $C_1$. The other input to the comparator 76 connects to the midpoint of the voltage divider consisting of resistors $R_6$–$R_9$. The chopper circuit, consisting essentially of the $FET_1$ and the comparator 76, controls the current to the undervoltage accessory coil 37 in the following manner. With the $FET_1$ in its "OFF" state, input pin 5 to the comparator is set at 2 volts at the junction of resistors $R_7$ and $R_8$. When the voltage across capacitor $C_1$ is less than 2 volts, the output pin 7 of the comparator 76 is "high", turning on the $FET_1$ and allowing current to flow through the undervoltage accessory coil 37. When the $FET_1$ is on, the circuit current through diode $D_6$, and Resistor $R_2$ develops a proportional voltage across $R_2$ and $R_9$. Capacitor $C_1$ charges to this voltage through diode $D_7$ and resistor $R_3$. Diode $D_6$, in series with resistor $R_2$, provides both voltage and temperature compensation for diode $D_7$ while resistor $R_3$ provides a short time delay during the charging cycle for capacitor $C_1$ so that the comparator 76 does not turn off prematurely due to the occurrence of a current spike during reverse recovery of diode $D_5$. For selected values of $R_2$ and $R_9$ at 30 milliamps circuit current, the voltage developed across $R_2$ and $R_9$ is approximately 3 volts. The voltage across $R_9$ adds to the voltage across $R_8$ to bias input pin 5 of the comparator 76 at approximately 3 volts. When the circuit current exceeds 30 milliamps, capacitor $C_1$ will charge greater than 3 volts driving the output pin 7 of the comparator 76 to a "low" state, thereby turning off the $FET_1$. With the $FET_1$ off, the voltage on input pin 5 reverts back to the 2 volt reference value. With 3 volts across capacitor $C_1$ the output of comparator 76 cannot go "high" until the voltage across $C_1$ drops to less than 2 volts. $C_1$ can only discharge through resistor $R_4$ which connects the output pin 1 of the second comparator 77, which is "low". The value of resistor $R_4$ is selected to provide a fixed time delay for the capacitor $C_1$ to decay to 2 volts thereby establishing a fixed off-time for the $FET_1$. The circuit current through the undervoltage accessory coil 37 is arranged to turn off at approximately 30 milliamps. Diode $D_5$ then circulates the energy stored in the inductance of the undervoltage accessory coil in order to maintain the current at a sufficiently high value to prevent the compression spring 43, in FIG. 2, from propelling the plunger 42 within the actuator-accessory unit 34 in the forward direction as indicated. The circuit current through the undervoltage accessory coil decays to approximately 20 milliamps after a predetermined time delay which is determined by the inductive and resistive properties of the undervoltage accessory coil 37. The resistor $R_4$ is selected to discharge capacitor $C_1$ from 3 volts to 2 volts in the same predetermined time delay. After the predetermined time delay, the output pin 7 of comparator 76 goes "high" causing the process just described to repeat itself. If the voltage applied to terminals $T_1$, $T_2$ should at any time drop below a predetermined value, the output pin 1 of the second comparator 77 will go "high" thereby charging the capacitor $C_1$ up to the positive rail voltage of the second comparator 77, which in turn, drives the output pin 7 of comparator 76 "low" to turn off the $FET_1$. When the voltage across terminals $T_1$, $T_2$, increases, the output pin 1 of the second comparator 77 is "low" causing the capacitor $C_1$ to discharge through resistor $R_4$. As soon as the voltage across capacitor $C_1$ decays to 2 volts, $FET_1$ turns on and the process described earlier repeats.

Resistors $R_{10}$, $R_{11}$ connecting across the negative and positive busses 75, 74 in combination with the second capacitor $C_2$, connecting across $R_{11}$, form a simple averaging circuit producing an approximately constant output voltage across $C_3$. The voltage value across $C_3$ determines the voltage value above which circuit current is applied to the undervoltage accessory coil 37 defined herein as the "pick-up" value and below which, current to the undervoltage accessory coil will be interrupted which is defined as the "drop-out" value. In operation, the average voltage established across capacitor $C_2$ is applied to the input pin 2 of the second comparator 77 through a current limiting resistor $R_5$. The current limiting resistor $R_5$ limits the current into the input pin 2 when the voltage across $C_2$ exceeds the positive rail voltage applied to the second comparator 77 at pin 8. Input pin 3 of the second comparator is set at approximately 7 volts by the voltage divider $R_6$–$R_9$ which determines the voltage appearing at the connection point between $R_6$ and $R_7$. When the voltage across capacitor $C_2$ is below 7 volts, the output pin 1 of the second comparator 77 goes "high" causing the first comparator 76 to interrupt the current to the undervoltage accessory coil 37. Conversely, when the voltage across $C_2$ is greater than 7 volts, the output pin 1 of the second comparator 77 is "low" thereby applying voltage to the gate electrode of the $FET_1$ to turn on the $FET_1$ and allow the comparator 76 to apply current to the undervoltage accessory coil 37. Resistor $R_{12}$, zener diode $D_8$, transistor $Q_1$ and capacitor $C_3$ serve to regulate the voltage at the emitter of $Q_1$ in the following manner. Resistor $R_{12}$ and zener diode $D_8$ establish a reference voltage for the base of $Q_1$ which in turn, supplies a regulated output voltage at the emitter of $Q_1$ which is applied to the junction of pin 8 on the second comparator 77 and resistor $R_6$. Resistor $R_{12}$ and the collector of a polar transistor $Q_1$ are connected with a storage capacitor $C_4$. The function of capacitor $C_3$ is to provide RF suppression to the base of transistor $Q_1$. The undervoltage circuit 72 requires a relatively low level of steady current, in the order of 1 milliampere, to maintain operation of the electronic devices such as $FET_1$, $FET_2$, comparators 76, 77 and transistor $Q_1$. A higher level of current, in the order of 30 milliamps, is applied to the undervoltage accessory coil 37 to generate sufficient magnetic flux to hold the plunger 42 of FIG. 2 against the charged compression spring 43. The 30 milliampere current to the undervoltage accessory coil must be maintained while the AC voltage applied to terminals $T_1$, $T_2$ passes through its zero crossing on each half of the AC cycle. This is accomplished by the combination of $FET_2$ with resistor R13 and storage capacitor $C_4$. Resistor $R_{13}$, in series with zener diode $D_{10}$, establishes a 30 volt gate reference voltage at the drain electrode of the $FET_2$ which sets a charge level of 30 volts for the storage capacitor $C_4$ connected to the junction of zener diode $D_9$, resistor $R_{12}$ and the collector of transistor $Q_1$. When capacitor $C_4$ is less than 30 volts and the AC voltage applied to terminals $T_1$, $T_2$ is greater than 30 volts, the gate electrode of $FET_2$ is positive with respect to the source electrode such that $FET_2$ applies charging current to the storage capacitor $C_4$. As $C_4$ approaches 30 volts, $FET_2$ turns off to apply the low level steady current requirements described earlier. Accordingly, zener diode $D_9$ protects the gate 8 of $FET_2$ from overvoltage conditions in the event that the AC voltage is applied to terminals $T_1$, $T_2$ when the capacitor $C_4$ is completely discharged. With capacitor $C_4$ fully charged, high ambient temperatures could cause leakage current in the $FET_2$ to increase the charging voltage applied to the storage capacitor $C_4$, in excess of the rated value of the capacitor. The zener diode $D_9$ functions to limit the voltage applied to the storage capacitor $C_4$ to one diode-voltage above the voltage across the zener diode $D_{10}$. Zener diode $D_9$ accordingly supplies a negative voltage to the gate electrode of the $FET_2$ to reduce the $FET_2$ leakage current and thereby protect the storage capacitor $C_4$ from excess voltage. As described earlier, the storage capacitor $C_4$ provides energy to the undervoltage accessory coil 37 when the voltage applied to terminals $T_1$, $T_2$ drops below the 30 volt level. The discharge path for the storage capacitor $C_4$ is through the internal source-drain diode of $FET_2$, the undervoltage accessory coil 37 through $FET_1$, diode $D_6$, resistors $R_2$, $R_9$ and back through the storage capacitor $C_4$.

The undervoltage release circuit of the instant invention substantially improves over conventional RC energy storage circuits because of its low power dissipation at high input voltages thereby allowing the highly beneficial use of smaller size and lower rated storage capacitors. Low power dissipation is provided by the $FET_2$ in circuit with the storage capacitor $C_4$ whereby capacitor $C_4$ is charged through operation of $FET_2$ only during the rising part of the wave form of the AC voltage applied across input terminals $T_1$, $T_2$ typically between 30–80 volts. The $FET_2$ remains off until the voltage again drops to less than 30 volts. Since the peak voltage appearing across the input terminals $T_1$, $T_2$ can exceed 350 volts, charging the storage capacitor $C_4$ at the lower voltage level is an important feature of the instant invention.

The shunt trip circuit 78 within the printed wire board 68, (FIG. 3) is depicted in FIG. 5 and contains the following components. Terminal T3 connects through a current limiting resistor $R_1$ to one input of a bridge rectifier consisting of diodes $D_1$–$D_4$ to provide positive potential to a positive bus conductor 90. Terminal $T_4$ connects through electric switch 47 to the other input to the bridge rectifier. A voltage suppressing varistor $Z_1$ is connected across the inputs to the bridge rectifier to protect the circuit 78 from excess voltage gradients. One output of the bridge rectifier connects through resistor $R_2$ with the positive bus 90 which terminates at the printed wire board edge-connector pad 64A. The other output of the bridge rectifier connects to the negative bus 91 and from there through a silicon bilateral switch SC1 to the other edge-connector pad 64B. A storage capacitor $C_1$ is connected across the positive and negative busses 90, 91 and becomes charged by the voltage applied across terminals $T_3$, $T_4$. When the voltage on capacitor $C_1$ is greater than the break-over voltage of the silicon bilateral switch $SC_1$, the capacitor $C_1$ discharges through the accessory coil 37 arranged as a shunt trip coil to articulate the circuit breaker operating mechanism as described in the aforementioned U.S. Pat. No. 4,700,161. A resistor $R_3$ bleeds off current from capacitor $C_1$ allowing the circuit breaker operating mechanism to be reset. Diode $D_5$ connected across the accessory coil 37 protects the coil from excess voltage during a shunt trip operation. The electric switch 47 located within the switch-electronics enclosure 29 best seen by referring to FIG. 3, protects the shunt trip accessory coil 37 from overheating by immediately disconnecting voltage to the printed wire board 68 as soon as the circuit breaker operating mechanism has responded. This is accomplished by the interaction of the bottom extension 86 of the operating lever 33 with the circuit breaker operating mechanism (not shown). The bottom extension of the operating lever holds the top extension 58 and angled tab 59 in contact with the electric switch plunger 60 as long as the bottom extension 86 remains in contact with the circuit breaker operating mechanism. When the shunt trip accessory coil 37 has articulated the circuit breaker operating mechanism, the bottom extension 86 of the operating lever 33 moves away from the electric switch plunger 60 allowing the plunger to extend and interrupt circuit through the switch 47 to immediately interrupt the voltage applied to the printed wire boards 61, 68 and hence to the shunt trip accessory coil 37 to prevent the shunt trip accessory coil from overheating. When the circuit breaker operating mechanism is turned on, the bottom extension 86 moves back into contact with the plunger 60 causing the electric switch 47 to close and restoring charging power to the storage capacitor $C_1$ of FIG. 5. The undervoltage release circuit 72 (FIG. 4) is contained on the printed wire board 61 of FIG. 3 whereas the shunt trip circuit 78 (FIG. 5) is contained on the printed wire board 68. The external wire conductors 31′ which control the shunt trip circuit 78 are shown in phantom in FIG. 3 to distinguish from the solid external wire conductors 31 which control the undervoltage release circuit 72.

Figure 6:
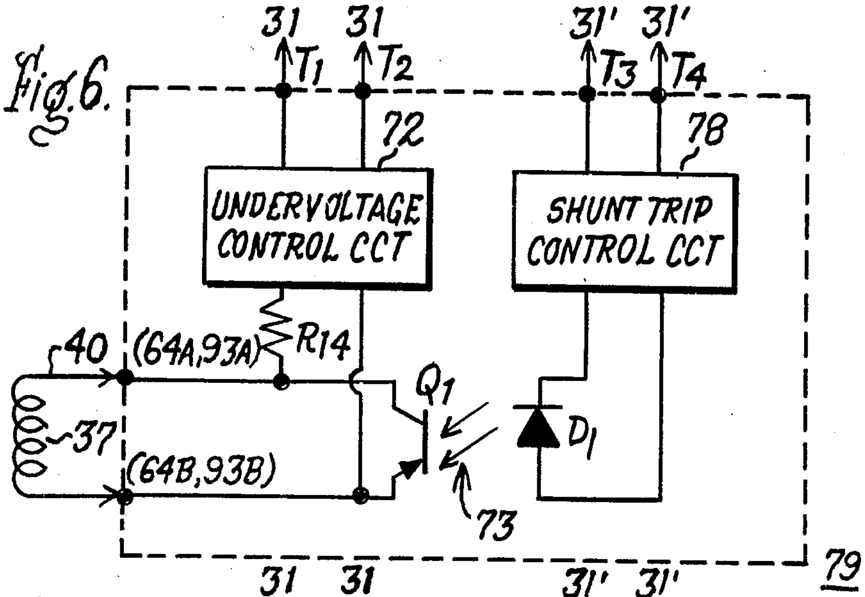
FIGS. 6, 7, 8 are diagrammatic representations of combined undervoltage release and shunt trip circuits on the printed wire board depicted in FIG. 3.

A combined undervoltage release and shunt trip control circuit 79 is shown in FIG. 6 wherein a common accessory coil 37 provides both undervoltage release and shunt trip functions. A first set of input terminals T1, T2 provides operating voltage to an undervoltage control circuit 72 such as that described earlier with reference to FIG. 4 and which connects with one leg of the combined undervoltage-shunt trip coil 37 through a current limiting resistor $R_{14}$ and connects directly with the other leg. The shunt trip control circuit 78, such as described earlier with reference to FIG. 5, connects with the combined undervoltage release and shunt trip coil 37 hereafter "combined accessory coil" by means of an opto-isolator 73. The opto-isolator includes a light emitting diode $D_1$ which connects with the shunt trip control circuit 78 over conductors in combination with a photo transistor $Q_1$. The collector and emitter of the photo transistor connect directly with the two legs 40 of the combined accessory coil 37. Both undervoltage release and shunt trip functions are obtained by applying the external power to input terminals $T_1$, $T_2$ to continuously energize the combined accessory coil 37 until an undervoltage condition is processed within the undervoltage control circuit 72 whereby the current to the combined accessory 37 is interrupted to allow the plunger 42 to become extended under the bias provided by the charged compression spring 43 within the actuator-accessory unit 34 (FIG. 2). The opto-isolator 73 prevents electrical interaction between the undervoltage control circuit 72 and the shunt trip control circuit 78. To operate the combined accessory coil 37 for shunt trip operation, a voltage is applied to the shunt trip control circuit 78 by means of terminals T3, T4. The opto-isolator 73 shunts a current supplied from the undervoltage control circuit 72 away from the combined accessory coil 37. This immediately causes the magnetic force on the plunger 42 to decrease to a value less than the holding force required to maintain the plunger 42 against the bias exerted by the charged compression spring 43 thereby projecting the plunger 42 forward as indicated.

Figure 7:
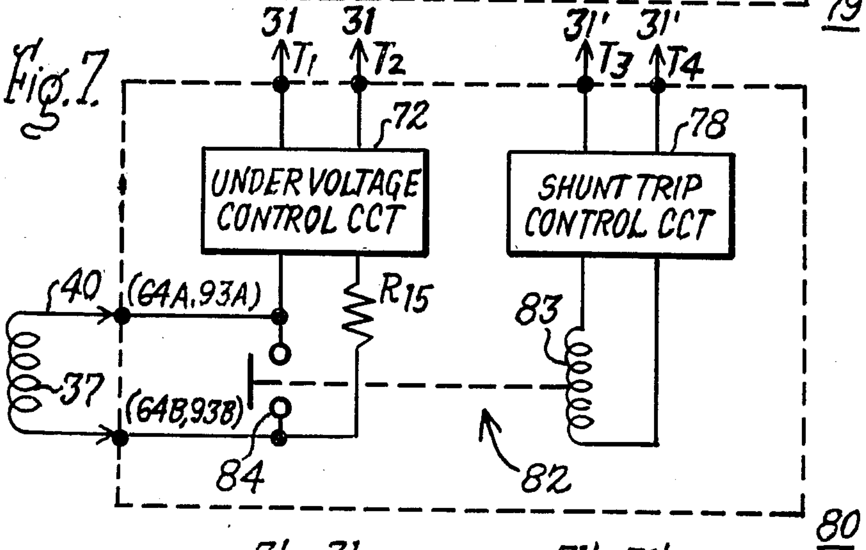

An alternate combined accessory circuit 80 is depicted in FIG. 7 wherein the opto-isolator 73 of FIG. 6 is replaced by an electromagnetic relay 82. The electromagnetic relay is normally "open" whereby the relay contacts 84 across the legs 40 of the combined accessory coil 37, are not connected together. Upon application of a voltage to the input terminals T3, T4 to the shunt trip control circuit 78, current is provided through the winding 83 of the electromagnetic relay 82 thereby connecting the contacts 84 and shorting the current applied to the combined accessory coil 37 provided by the undervoltage control circuit. The plunger 42 within the actuator-accessory unit 34 of FIG. 2 responds in the manner described earlier with reference to FIG. 6.

Figure 8:
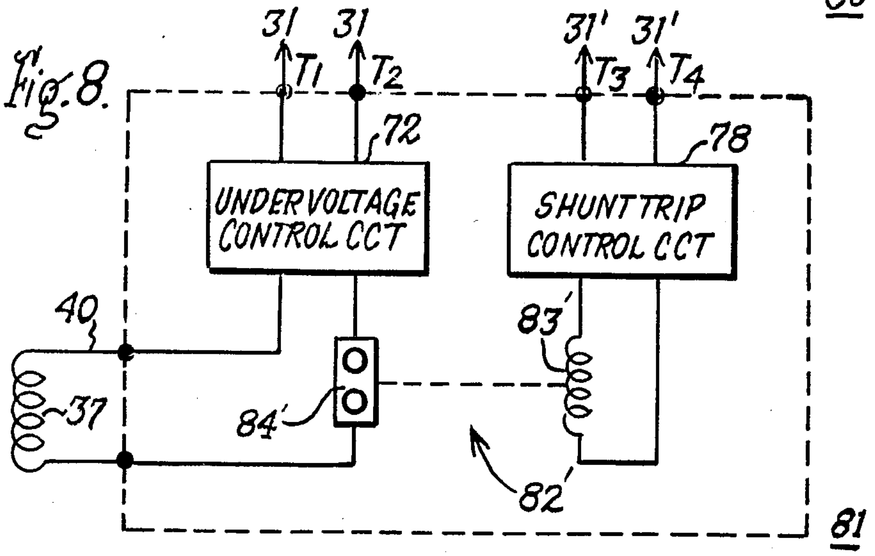

A further embodiment of a combined accessory circuit 81 is depicted in FIG. 8 with the normally "open" relay 82 of FIG. 7 replaced with a normally "closed" relay 82′. The undervoltage control circuit 72 connects directly with one leg of the combined accessory coil 37 and connects with the other leg through the closed contacts 84′ in series with the undervoltage release control circuit 72. A voltage is applied to the input terminals T1, T2 to the undervoltage control circuit 72 and provides a holding current through the combined accessory coil 37 through the closed contacts 84′. When a shunt trip function is to be performed, a voltage is applied to the input terminals T3, T4 to the shunt trip control circuit 78 activating the electromagnetic relay 83′ and opening the normally closed contact 84′. This interrupts the holding current to the combined accessory coil 37 causing the plunger 42 within the actuator-accessory unit 34 of FIG. 2 to extend as described earlier for the circuits of FIGS. 6 and 7.

Having thus described my invention, what I claim as new and desire to secure by Letters Patent is:

1. Molded case circuit breaker having a combined trip actuator and accessory unit comprising:

a molded plastic circuit breaker cover and case, said cover defining an enclosure space;

a circuit breaker operating mechanism within said case and having means separating a pair of contacts to interrupt circuit current through said contacts;

a trip actuator-accessory unit within a first recess in said circuit breaker cover proximate said circuit breaker operating mechanism which interacts with said circuit breaker operating mechanism to separate said contacts automatically upon overcurrent conditions through said contacts and to interact with said operating mechanism upon receipt of a remote trip signal;

an electric switch-electronics unit within a second recess in said circuit breaker cover, an electric switch in said electric switch-electronics unit which interrupts said remote trip signal upon separation of said contacts and a printed circuit board in said electric switch-electronics unit providing operating power to said trip actuator-accessory unit;

wherein said trip actuator-accessory unit includes an undervoltage coil arranged for providing a magnetic holding force to hold a trip armature against the bias of a charged compression spring; and including a flux shift coil within said trip actuator-accessory unit for diverting said holding force away from said armature to allow said armature to interact with said circuit breaker operating mechanism upon occurrence of said overcurrent condition.

2. The molded case circuit breaker of claim 1 including means on a printed wire board removably connecting with means within said second recess for electrically connecting an undervoltage circuit with said undervoltage coil.

3. The molded case circuit breaker of claim 2 wherein said removable connection means comprises edge-connector pads on said printed wire board and stab connectors within said second recess.

4. The molded case circuit breaker of claim 3 wherein said undervoltage coil ceases to provide magnetic holding force to said trip armature when a remote voltage signal drops to a predetermined voltage for a predetermined time.

5. The molded case circuit breaker of claim 4 wherein said undervoltage circuit includes a pair of comparators, output connections from one of said comparators being connected with input connections to the other of said comparators and to a FET for controlling operation of said FET, said FET controlling holding current to said undervoltage coil.

6. The molded case circuit breaker of claim 5 including a storage capacitor connecting with said undervoltage coil through a second FET for regulating said holding current to said undervoltage coil.

7. The molded case circuit breaker of claim 1 including a shunt trip circuit connecting with said undervoltage coil.

8. The molded case circuit breaker of claim 7 including a silicon switch element within said shunt trip circuit for controlling said remote trip signal.

9. The molded case circuit breaker of claim 7 wherein said shunt trip circuit connects with said undervoltage circuit by means of an opto-isolator.

10. The molded case circuit breaker of claim 7 wherein said shunt trip circuit connects with said undervoltage circuit by means of a normally open or normally closed relay.

11. The molded case circuit breaker of claim 9 wherein said opto-isolator includes a photo detector connected across said undervoltage coil and a photo transmitter connected within said shunt trip circuit whereby a control signal voltage applied to said shunt trip circuit energizes said photo transmitter and said photo detector to short circuit said undervoltage coil.

12. The molded case circuit breaker of claim 10 wherein said relay includes a pair of open contacts and a bridging contact connected across said undervoltage coil and a relay coil connected within said shunt trip circuit whereby a control signal voltage to said relay coil causes said bridging contact to short circuit said pair of open contacts and said undervoltage coil.

13. The molded case circuit breaker of claim 10 wherein said relay includes a pair of contacts electrically in series with said undervoltage coil with a bridging contact arranged across said pair of contacts and a relay coil connected within said shunt trip circuit whereby a control voltage signal to said relay coil moves said bridging contact away from said pair of contacts to interrupt said external voltage source applied to said undervoltage coil.

* * * * *